United States Patent
Husson, Jr. et al.

(10) Patent No.: US 7,008,515 B1
(45) Date of Patent: Mar. 7, 2006

(54) SOLAR WATER STILL

(75) Inventors: Frank D. Husson, Jr., San Diego, CA (US); Carl J. Lennox, San Diego, CA (US); Luis M. Piek, San Diego, CA (US); Brian S. Hunnicutt, Carlsbad, CA (US); Brian L. Spare, San Diego, CA (US)

(73) Assignee: Solar Solutions, LLC, San Diego, CA (US)

( * ) Notice: Subject to any disclaimer, the term of this patent is extended or adjusted under 35 U.S.C. 154(b) by 0 days.

(21) Appl. No.: 09/743,945

(22) PCT Filed: Jul. 7, 1999

(86) PCT No.: PCT/US99/15504

§ 371 (c)(1),
(2), (4) Date: Dec. 22, 2003

(87) PCT Pub. No.: WO00/03779

PCT Pub. Date: Jan. 27, 2000

(Under 37 CFR 1.47)

(51) Int. Cl.
*B01D 1/00* (2006.01)
*B01D 3/02* (2006.01)
*C02F 1/14* (2006.01)

(52) U.S. Cl. .................. 202/83; 159/904; 159/906; 202/234; 203/10; 203/100; 203/DIG. 1; 392/395

(58) Field of Classification Search ............... 159/903, 159/904, 906, DIG. 15; 202/83, 234, 267.1, 202/267.2; 203/10, 86, 100, DIG. 1; 392/395
See application file for complete search history.

(56) References Cited

U.S. PATENT DOCUMENTS

| | | | | | |
|---|---|---|---|---|---|
| 3,390,056 A | * | 6/1968 | Ingram | ........................ | 159/904 |
| 3,415,719 A | * | 12/1968 | Telkes | .......................... | 159/904 |
| 3,501,381 A | * | 3/1970 | Delano | ........................ | 159/904 |
| 4,219,387 A | * | 8/1980 | Gruntman | .................... | 159/904 |
| 4,959,127 A | * | 9/1990 | Michna | ...................... | 159/48.1 |
| 5,409,578 A | * | 4/1995 | Kaneko | ........................ | 159/903 |

FOREIGN PATENT DOCUMENTS

IN 178572 12/1993

OTHER PUBLICATIONS

*Speed Plastics Limited* web page printout for "Solar Water Still".

* cited by examiner

Primary Examiner—Virginia Manoharan
(74) Attorney, Agent, or Firm—Foley & Lardner; Stephen E. Reiter

(57) ABSTRACT

A solar water still (10) includes an enclosure assembly (12) and an evaporation assembly (14) that float on a body of source water and that are readily collapsed and folded for storage or transport. The enclosure assembly includes a transparent conical dome (20) covering a collection reservoir (18) and an inner float ring (16). The evaporation assembly is placed in the center of the inner float ring. During operation, solar radiation induces water to evaporate from the evaporation assembly. The water vapor is then condensed and collected by the enclosure assembly.

2 Claims, 3 Drawing Sheets

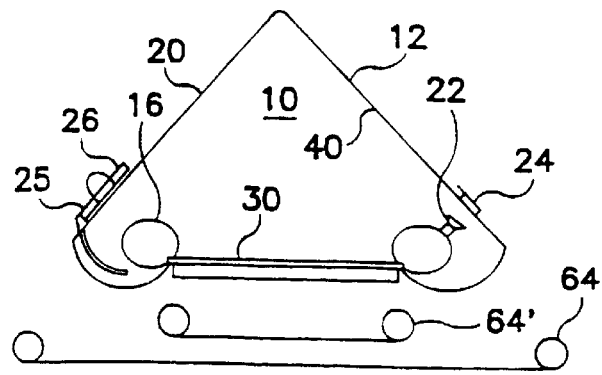
FIG. 7
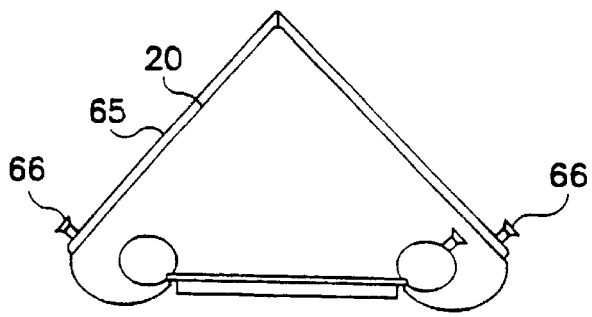
FIG. 8
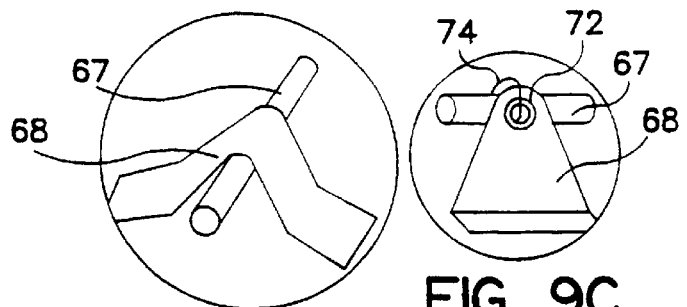
FIG. 9B
FIG. 9C
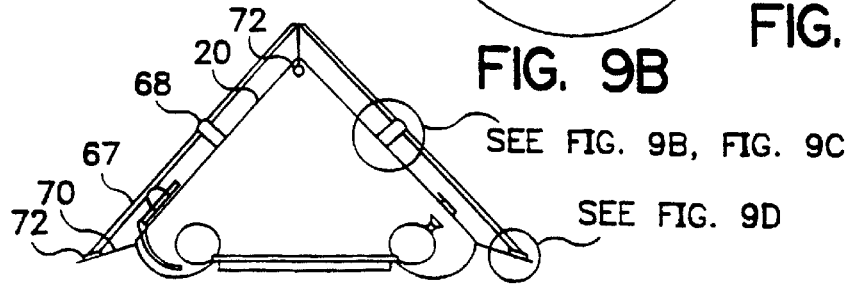
SEE FIG. 9B, FIG. 9C
SEE FIG. 9D
FIG. 9A
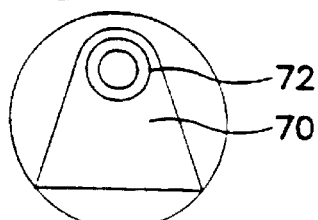
FIG. 9D

US 7,008,515 B1

SOLAR WATER STILL

RELATED APPLICATIONS

This is a 371 filing based on PCT Application No. US99/15504, filed Jul. 7, 1999, which claims priority from U.S. application Ser. No. 09/118,412, filed Jul. 17, 1998, now abandoned, and U.S. Application No. 60/130,766, filed Apr. 23, 1999, now inactive.

FIELD OF THE INVENTION

The present invention relates to solar water stills and, more particularly, to a portable solar water still that may be readily transported and stored.

BACKGROUND OF THE INVENTION

Existing solar water stills generally include a bulky structure that prevents the still from being readily transported and stored or that complicates the structure and increases its manufacturing costs. Further, the structural components tend to reduce the reliability of the solar water still and give rise to the possibility that the still could be rendered inoperable by relatively minor structural damage. Additionally, existing solar water stills have complicated undistilled water loading mechanisms or other configurations that give rise to the possibility of contamination of the resulting distilled water by the undistilled water.

Accordingly, there exists a definite need for a solar water still that is readily transportable, easily stored, and that has a simple, cost-effective design for providing a supply of potable water. The present invention satisfies these needs and provides further related advantages.

SUMMARY OF THE INVENTION

The present invention provides a solar water still having a simple inflatable design for providing a renewable supply of drinking water to a person. Moreover, the construction of the invention water still renders the still relatively inexpensive to manufacture, trouble-free and reliable in use, and readily collapsed and folded for storage or transport.

The invention is embodied in a solar water still having an enclosure assembly and an evaporation assembly. The enclosure assembly has an inner float barrier that surrounds an evaporation area, a collection reservoir that surrounds the inner float barrier for collecting distilled water, and a dome that is substantially transparent to solar radiation and that encloses the collection reservoir, the inner float barrier, and the evaporation area. The evaporation assembly is located in the evaporation area and has an evaporative surface. Water that evaporates from the evaporative surface condenses on the interior surface of the dome and flows into the collection reservoir as distilled water.

In another feature of the invention, the enclosure assembly floats on a body of undistilled source water and the evaporation assembly includes a buoyant insulator and a wick material. The buoyant insulator floats on the source water and is substantially flat, having a top surface and a bottom surface. The top surface is thermally insulated from the bottom surface and forms the evaporative surface. The wick material extends from the top evaporative surface toward the bottom surface for transporting source water to the evaporative surface. Solar radiation incident on the evaporative surface causes water to be evaporated from the evaporative surface. The evaporated water is replaced by source water transported to the top surface by the wick.

In an alternative embodiment of the invention, the solar water still includes a collection reservoir, a barrier, and an enclosure. The collection reservoir collects distilled water and the barrier separates the collection reservoir from an evaporation area. The barrier has a first wall surface that contacts undistilled source water in the evaporation area and a second wall surface that contacts distilled water in the collection reservoir. The barrier extends above the evaporation area and above the collection reservoir to prevent liquid flow between the evaporation area and the collection reservoir. The enclosure is substantially transparent to solar radiation and encloses the collection reservoir, the barrier, and the evaporation area. The enclosure is configured such that source water that evaporates from the evaporation area and that condenses on an interior surface of the enclosure flows into the collection reservoir.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 7 is a cross-sectional elevation view of an embodiment of a conical solar water still, in accordance with the invention, showing two inflatable pools, for use of the solar still on land.

FIG. 8 is a cross-sectional elevation view of an embodiment of a conical solar water still, in accordance with the invention, showing an integrated inflatable support system for maintaining the still inflated during extreme weather conditions or during use on land.

FIGS. 9A–9D are cross-sectional elevation views of an embodiment of a conical solar water still, in accordance with the invention, showing an external rigid support system for use during extreme weather conditions or during use on land.

DETAILED DESCRIPTION OF THE PREFERRED EMBODIMENTS

Figure 1:
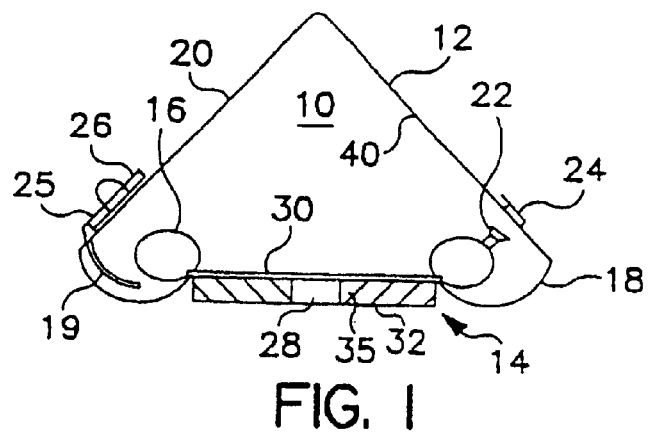
FIG. 1 is a cross-sectional elevation view of a conical solar water still, in accordance with the invention.

In accordance with the invention, there is provided a solar water still comprising an enclosure assembly having an inner float barrier that surrounds an evaporation area, a collection reservoir that surrounds the inner float barrier for collecting distilled water, a dome that is substantially transparent to solar radiation and that encloses the collection reservoir, the inner float barrier, and the evaporation area;

and an evaporation assembly located in the evaporation area and having an evaporative surface.

In a preferred embodiment of the invention, the enclosure assembly is configured to float on a body of source water; and the evaporation assembly comprises a buoyant insulator that is configured to float on the source water, the insulator being substantially flat and having a top surface and a bottom surface, wherein the top surface is thermally insulated from the bottom surface and forms the evaporative surface and comprises a wick material that extends from the top evaporative surface toward the bottom surface for transporting source water to the evaporative surface.

In accordance with the invention, there is provided a solar water still alternatively comprising a collection reservoir; a barrier that separates the collection reservoir from an evaporation area, wherein the barrier has a first wall surface that contacts source water in the evaporation area and a second wall surface that contacts distilled water in the collection reservoir, and wherein the barrier extends above the evaporation area and above the collection reservoir to prevent liquid flow between the evaporation area and the collection reservoir; an enclosure that is substantially transparent to solar radiation, that encloses the collection reservoir, the barrier, and the evaporation area, wherein the enclosure is configured such that source water that evaporates from the evaporation area and that condenses on an interior surface of the enclosure flows into the collection reservoir.

As shown in the drawings, the present invention is embodied in a solar water still 10 having a simple inflatable design for providing a renewable supply of distilled water to a person in a daily survival or emergency situation. The still may be manufactured from relatively inexpensive materials and may be designed to float on a body of source water.

Figure 2:
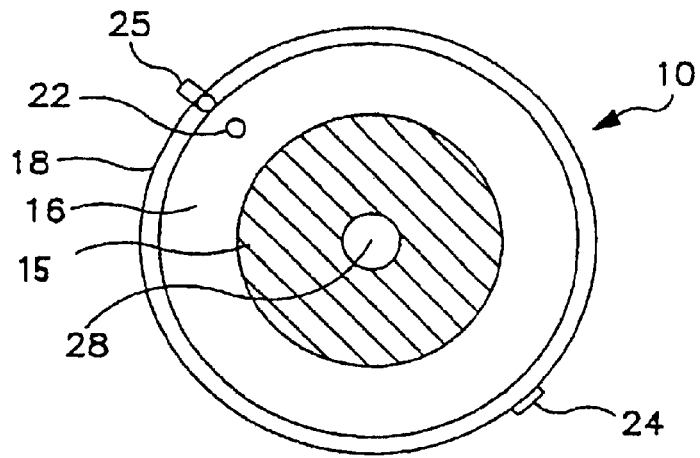
FIG. 2 is a plan view of the solar water still of FIG. 1, further showing a floating evaporation assembly.

With reference now to FIGS. 1 and 2, the still 10 includes an enclosure assembly 12 and an evaporation assembly 14 which are readily collapsed and folded for storage or transport. During operation, solar radiation induces water to evaporate from the evaporation assembly. The resulting water vapor is then condensed and collected by the enclosure assembly.

The enclosure assembly 12 includes an inner float tube or ring 16, a catch basin or collection reservoir 18, and a conical dome 20. The dome may be constructed of a variety of flexible, optically transparent materials, e.g., flexible films of such materials as clear vinyl (e.g., polyvinyl chloride), urethanes, polyesters (e.g., polyethylene terephthalate), polyamides, polysiloxanes, polyalkylenes (e.g., polyethylene), polycarbonates, and the like, as well as blends thereof (e.g., polyethylene-nylon), laminates thereof, and the like, formed in a conical shape that allows solar radiation to pass through the dome and heat the wick assembly 15. As defined herein, the term dome is defined to include a variety of shapes, such as the conical structure in FIG. 1, and is not limited to hemispherical structures.

The inner float ring is a flexible toroidal ring of flexible film and includes an inflation valve 22 for inflating the ring and providing shape and structural strength to the bottom of the enclosure assembly. The collection reservoir may be a pocket of flexible film attached between the inner float ring and the conical dome such that the reservoir loops outside and attaches to the inner float ring. Accordingly, the collection reservoir water is separated from the source water by the float ring and the flexible film.

The reservoir's flexible film is attached to the inner float ring and the conical dome by any suitable means, e.g. by a radio frequency (RF) seal, sonic weld, by a heat seal, or the like, to form an air and water tight seal within the enclosure assembly. Accordingly, when the inner float ring is floating on a body of source water, the air within the enclosure assembly is trapped within the still 10 because the source water prevents the air from exiting through the center of the inner float ring. The reservoir may rest at the surface of the water line or extend below the water line of the source water and, as it fills with distilled water, may further act as a condenser because it is adjacent to and cooled by the source water.

The reservoir may include a drain valve or capped spout 24 having a cap, or a clamp. Also, a straw 25, having a removable cap 26, may be attached through a sealed opening in the conical dome 20 at a location that lies above the water line of the source water. Opposite the straw, within the dome, may be a tube 19 that extends down into the reservoir 18 and that is pliable and flexible to avoid puncturing the still 10 during operation and when folding the still for storage or transport. A suitable device for providing the sealed opening into the reservoir or dome may be a seal, such as, for example, part number CARMO 3-802, available from KABAR Manufacturing Corp. of Farmington, N.Y.

The evaporation assembly 14 has a flat disk-like shape and may be attached to the outside of the inner collection reservoir 18 in contact with the source water by a suitable means, e.g., a hook and loop fastener such as Velcro (not shown). The wick assembly may be formed of a buoyant insulator 35 made of suitable material, e.g., open or closed-cell foam, and may have a hole 28 placed therethrough. Good thermal insulation between the buoyant insulator's top evaporative surface 30 and its bottom surface 32 is particularly valuable for increasing the effectiveness of the evaporation assembly.

Figure 3:
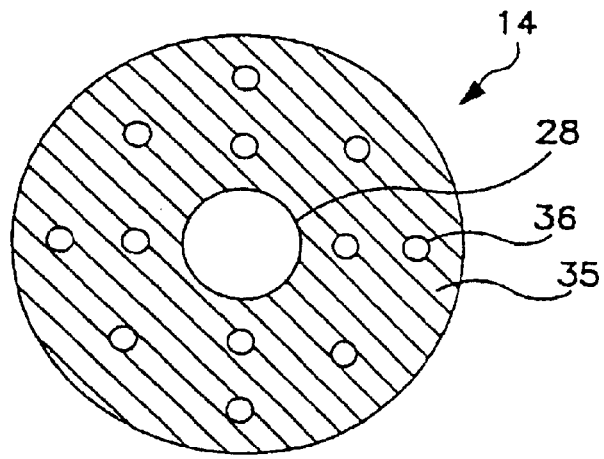
FIG. 3 is a plan view of another embodiment of a floating evaporation assembly having additional wicking holes, in accordance with the invention.

As shown in FIG. 3, the evaporation assembly 14 may include additional holes 36 to facilitate the conveyance of moisture from the source water to a top evaporative surface 30. The holes, 28 and 36, may be left open or may be filled with suitable transport media, e.g., a sponge material, open-cell urethane foam, or other material that exhibits wicking or capillary action for transporting source water to the top evaporative surface which is covered with a black wick material such as felt, fibrous carpet, cloth, or the like, having fine hair-like fibers. For example, the evaporative surface may be covered with crest black carpet which is available from Bretlin, Inc. of Dalton, Ga.

Figure 4:
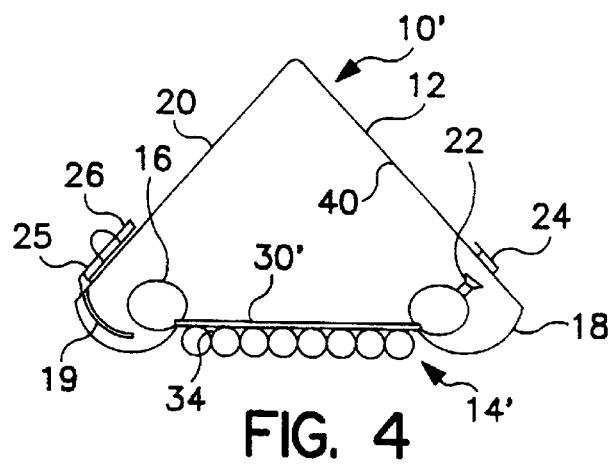
FIG. 4 is a cross sectional elevation view of an embodiment of a solar water still, in accordance with the invention, with an inflatable evaporation assembly having corrugated surfaces.

Alternatively, as shown in FIG. 4, an evaporation wick assembly 14' may be formed of an inflatable assembly made of flexible film, which likewise insulates the evaporative surface 30 from the source water on which the evaporation assembly floats. The evaporation assembly preferably has a relatively flat top surface 30' having corrugated surface features forming depressions 34 for holding small quantities of source water initially placed or wicked onto the evaporative surface.

Figure 5:
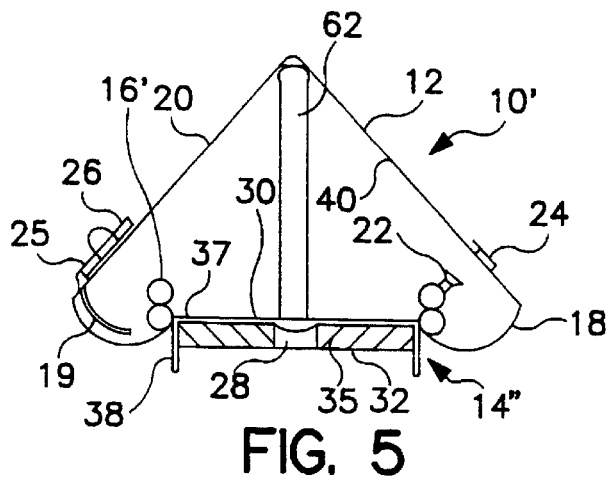
FIG. 5 is a cross-sectional elevation view of an embodiment of a conical solar water still, in accordance with the invention, showing a plurality of inflation rings, a solid or inflatable support structure and a buoyant evaporation assembly having a draped wicking material.

As shown in FIG. 5, an evaporation assembly 14" may be formed with carpet 37 having flaps 38 for contacting the source water. The flaps enable the carpet to better wick the source water to the top evaporative surface 30 for heating. The buoyant insulator may include the central hole 28 and the carpet may hang or sag down into the hole and contact the source water for improved water transport to the top evaporative surface through the carpet.

In operation, the user unrolls the still's enclosure assembly 12 and evaporation assembly 14' from a package. The evaporation assembly is inflated, pre-wetted by the user, and placed upon the surface of the source water. The user inflates the inner float ring 16 and then holds the still by the tip of the conical dome 20 and drops the still enclosure assembly over the evaporation assembly to inflate the dome. The dome remains inflated by the air trapped within the still and further inflates as the enclosed air heats up and water evaporates and will thus retain its conical shape.

Optionally, as shown in FIGS. 5, 6, 8 and 9, the dome may include structural members in the form of rigid rods, inflatable support tubes 62, or the like that may be placed inside the solar still or inserted into pockets on the conical dome 20, to ensure that the conical dome does not deflate in the presence of an air leak. As shown in FIG. 5, the inflatable support tube 62 has one end that is placed in the apex of the conical dome and an opposite end that is attached to the evaporative assembly by suitable means, e.g., a hook and loop fastener. The user secures the evaporation assembly to the enclosure assembly by suitable means, e.g., a hook and loop fastener to prevent the evaporation assembly from floating away from the still. The user also secures the still to prevent the still from floating away from the user's location or from being overturned in high winds.

Referring to FIGS. 1 and 4, the still 10 operates during the daylight hours. Solar radiation passing through the conical dome 20 strikes and heats the evaporative surface 30. The source water is wicked to the evaporative surface as incident solar radiation heats and evaporates the water on the black wick material. The evaporated water vapor saturates the air inside the conical dome and some of the water vapor condenses on the inner surface of the dome 40 and flows down the inner surface into the collection reservoir 18. At the end of a day, or other suitable time period, the distilled water is removed from the collection reservoir.

The distilled water may be sucked directly out of the collection reservoir 18 using the straw 25. Alternatively, the distilled water may be drained from the collection reservoir into a container by detaching the evaporation assembly 14 from the still 10 and pouring the distilled water out of the valve or spout 24. When draining distilled water from the still in this manner, the enclosure assembly 12 is tipped so that the distilled water collects at the head of the drain valve. The valve is then opened and the distilled water drains from the collection reservoir into the container. After the distilled water is removed, the still can either be placed back on the water and left overnight so that production can begin again early the next day, or the enclosure assembly may be refolded and the evaporation assembly may be rolled around the enclosure assembly to form a relatively small package for storage or travel.

A still 10 having a dome 20 with a height of about 76 centimeters (30 inches) and a wick assembly 14 having a diameter of about 79 centimeters (31 inches) has been found to produce about 1.5–2.5 liters of distilled water a day while floating on a fresh water lake under direct exposure to sunlight, depending on weather conditions. The still's inner float tube 16 has a radius of about 15.3 centimeters (6 inches) and the collection reservoir 18 has a semicircular radius of about 20 centimeters (8 inches). The evaporation assembly is formed of an inflatable device made of clear vinyl 0.6 millimeters (12 mils) thick. The clear urethane of the dome has a thickness of about 0.15 millimeters (6 mils), although more economical (and less durable) embodiments of the invention may have a thickness of 3 mils or less.

Figure 6:
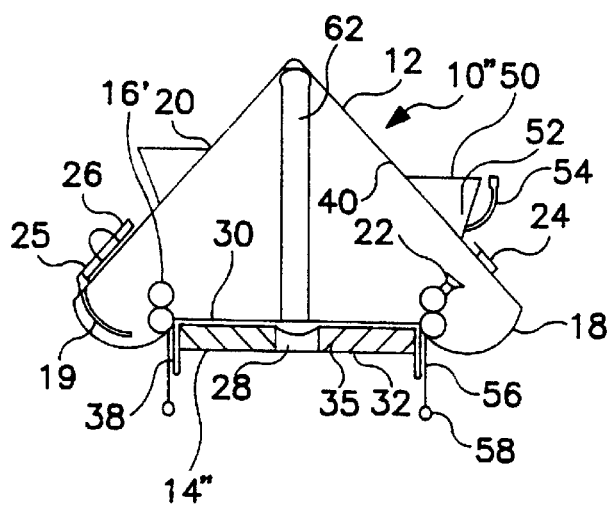
FIG. 6 is a cross-sectional elevation view of an embodiment of a conical solar water still, in accordance with the invention, including a catch basin for collecting rain water, a skirt and weights for use in ocean or rough waters.

An alternative embodiment of the solar still 10" is shown in FIG. 6. The features shown in addition to FIG. 5 are advantageous for increasing the effectiveness of the solar water still in more adverse conditions. These additional features may be included in the still individually or collectively in accordance with the cost and requirements that various applications of the invention may dictate.

The enclosure assembly 12' may further include a rain catch basin 50 for collecting rain on a rainy day. The rain catch basin is formed of a cylindrical ring of flexible material or film, which is attached to the conical dome 20. The rain catch basin may be attached to the conical dome so that the catch basin is slightly slanted in order for the rainwater to accumulate toward one side 52 of the catch basin. The catch basin may also include a drain hose 54 or straw for ease of emptying the catch basin.

The enclosure assembly 12' may further include a double tube inner float ring 16' for greater separation of the distilled water in the collection reservoir 18 from the source water. The double tube inner float ring is formed of two inflatable attached tubes. Alternatively, the tube 16' may also have a non-circular shape such as an oval shape for providing such separation.

The enclosure assembly 12' may further include a skirt or flap 56 for improving the sealing of the enclosure and the stability of the still 10' in the presence of rough or wavy waters. The skirt may be a flexible flap formed of flexible film or the like which is attached to the inner float ring 16' or to the collection reservoir 18. Further, the skirt may include weights 58 that maintain the cylindrical shape of the skirt 56 to prevent air from escaping out of the dome 20 as the still floats on a wavy water surface.

Other modifications to the solar water still 10' may be made in accordance with the present invention. For example, the tube 54 may be attached through a small water collection cone for facilitating emptying the respective basins 18 and 52. Further, the collection reservoir may include an inflatable ring for maintaining the collection reservoir's shape with respect to the inner float ring.

Also, the dome may be a semi-spherical dome having integral Fresnel lenses stamped into the dome for concentrating the incoming solar radiation on the evaporation assembly to create localized spots of increased water vaporization.

As shown in FIG. 7, for land use, the solar water still 10' may be placed in an inflatable wading pool 64 or the like. Likewise, a small tub or inflatable wading pool 64' may be placed in the center of the inner float ring 16 and an appropriately sized evaporation assembly may be placed in the tub. Alternatively, moisture laden material, such as leaves, grass, or the like, may be placed in the center of the inner float ring 16 for evaporation of the material's moisture content. The efficiency of a land use still may be reduced because of the lack of cooling outside of the dome provided by evaporation from the lake or ocean surface.

Referring to FIG. 8 and FIGS. 9A–9D, an external support system may be provided to prevent the solar still from deflating in extreme weather conditions. The support system may consist of a plurality (e.g., three) of inflatable tubes 65 sealed into the dome 20 (FIG. 8), each tube including an inflation valve 66. Alternatively, rigid rods 67 (FIGS. 9A–9D) made of suitable rigid material, e.g., fiberglass, plastic, bamboo, or the like, may be attached to the outer portion of the solar still by suitable means, e.g., by tabs 68 located along the height of the dome and by a mounting grommet 72 at the apex of the dome. The ends of the rigid poles may be attached to the lower portion of the solar still using suitable means, e.g., flaps 70 with mounting grommets 72 (FIG. 9D). The tabs may be in the form of a strip of flexible film sealed to the dome (FIG. 9B), as tabs reinforced with grommets 72, attached to the dome and that then may be tied onto the rigid poles using string 74 (FIG. 9C), or the like.

While the foregoing has been with reference to specific embodiments of the invention, it will be appreciated by those skilled in the art that these are illustrations only and that changes in these embodiments can be made without departing from the principles of the invention, the scope of which is defined by the appended claims.

We claim:

1. A solar water still, comprising:
   a) an enclosure assembly having
      i) an inner float barrier that surrounds an evaporation area,
      ii) a collection reservoir that surrounds the inner float barrier for collecting distilled water,
      iii) a dome that is substantially transparent to solar radiation and that encloses the collection reservoir, the inner float barrier, and the evaporation area; and
   b) an evaporation assembly located in the evaporation area and having an evaporative surface;
   wherein the enclosure assembly (a) is configured to float on a body of source water;
   wherein the evaporation assembly (b) comprises:
      i) a buoyant insulator that is configured to float on the source water, the insulator being substantially flat and having a top surface and a bottom surface, wherein the top surface is thermally insulated from the bottom surface and forms the evaporative surface; and
      ii) a wick material that extends from the top evaporative surface toward the bottom surface for transporting source water to the evaporative surface; and
   wherein the evaporative surface is covered with black carpet;
   wherein the black carpet is the wick material and covers the evaporative surface; and
   wherein the black carpet hangs over the edge of the buoyant insulator for contacting the source water.

2. A solar water still, comprising:
   a) an enclosure assembly having
      i) an inner float barrier that surrounds an evaporation area,
      ii) a collection reservoir that surrounds the inner float barrier for collecting distilled water,
      iii) a dome that is substantially transparent to solar radiation and that encloses the collection reservoir, the inner float barrier, and the evaporation area; and
   b) an evaporation assembly located in the evaporation area and having an evaporative surface;
   wherein the enclosure assembly (a) is configured to float on a body of source water;
   wherein the evaporation assembly (b) comprises:
      i) a buoyant insulator that is configured to float on the source water, the insulator being substantially flat and having a top surface and a bottom surface, wherein the top surface is thermally insulated from the bottom surface and forms the evaporative surface; and
      ii) a wick material that extends from the top evaporative surface toward the bottom surface for transporting source water to the evaporative surface; and
   wherein the evaporative surface is covered with black carpet;
   wherein the black carpet is the wick material and covers the evaporative surface; and
   wherein the buoyant insulator includes at least one hole at the center of the insulator and the black carpet droops into at least one hole at the center of the buoyant insulator for contacting the source water.

* * * * *

UNITED STATES PATENT AND TRADEMARK OFFICE
CERTIFICATE OF CORRECTION

| | | |
|---|---|---|
| PATENT NO. | : 7,008,515 B1 | Page 1 of 1 |
| APPLICATION NO. | : 09/743945 | |
| DATED | : March 7, 2006 | |
| INVENTOR(S) | : Husson, Jr. et al. | |

It is certified that error appears in the above-identified patent and that said Letters Patent is hereby corrected as shown below:

Title page, item [75] inventor insert name from Carl J. Lennox to --Carl J. S. Lenox--.

Signed and Sealed this

Tenth Day of March, 2009

JOHN DOLL
*Acting Director of the United States Patent and Trademark Office*